United States Patent [19]

Weisenburger

[11] 4,156,959

[45] Jun. 5, 1979

[54] EXPANDER DEVICE

[76] Inventor: August Weisenburger, Sophienstrasse 6, D 6 Frankfurt 90, Fed. Rep. of Germany

[21] Appl. No.: 641,700

[22] Filed: Dec. 17, 1975

[30] Foreign Application Priority Data

Dec. 21, 1974 [DE] Fed. Rep. of Germany ....... 2461003

[51] Int. Cl.$^2$ ............................................. B23P 19/08

[52] U.S. Cl. .................................... 29/225; 254/10.5; 81/314; 81/302; 81/338

[58] Field of Search ................. 29/229, 225, 224, 222, 29/227, 223; 81/302, 300, 314, 428, 318, 342, 328, 337, 338, 383; 254/10.5, 71

[56] References Cited

U.S. PATENT DOCUMENTS

| | | | |
|---|---|---|---|
| 1,616,621 | 2/1927 | Hooks | 81/314 |
| 1,951,953 | 3/1934 | Tollonitsch | 254/10.5 |
| 2,384,408 | 9/1945 | Warren | 81/5.1 R |
| 3,169,307 | 2/1965 | Langwell | 29/229 |
| 3,354,755 | 11/1967 | Legrande | 81/314 |
| 3,365,782 | 1/1968 | Madeira | 29/229 |
| 3,909,903 | 10/1975 | Bouquet | 29/229 |

FOREIGN PATENT DOCUMENTS

| | | | |
|---|---|---|---|
| 189681 | 12/1922 | United Kingdom | 81/332 |

*Primary Examiner*—Gary L. Smith
*Assistant Examiner*—Roscoe V. Parker
*Attorney, Agent, or Firm*—Michael J. Striker

[57] ABSTRACT

An expander device, particularly for use in expanding springs, piston rings, circlips and similar objects, comprises a support member and an actuating member which are pivotally connected to one another and equipped with handgrip portions. A pair of expanding jaws is mounted on the support member for pivoting in a plane which is parallel to the axis of pivoting of the actuating member relative to the support member. A transmission converts the pivoting of the actuating member into spreading apart of the jaws, the transmission including a ratchet mechanism which includes a toothed rack mounted on a guide track for movement in the frontward direction of the device, a transporting pawl which is actuated by the actuating member so as to engage the teeth of the rack and to move the latter, and an arresting pawl which arrests the rack against movement in the rearward direction of the support member. Connecting links are pivoted to the rack, on the one hand, and to the jaws, on the other hand and cause the jaws to spread apart as the rack moves in the frontward direction so as to expand an object extending between the free ends of the jaws. The jaws may include separate lever and jaw elements, and additional connecting links may be provided which pivotally connect the respective jaw element with the other lever element on which the other jaw element is pivoted. The additional links may be guided on the other lever elements in elongated slots, and arrested in a plurality of positions in such slots.

35 Claims, 7 Drawing Figures

FIG. 1
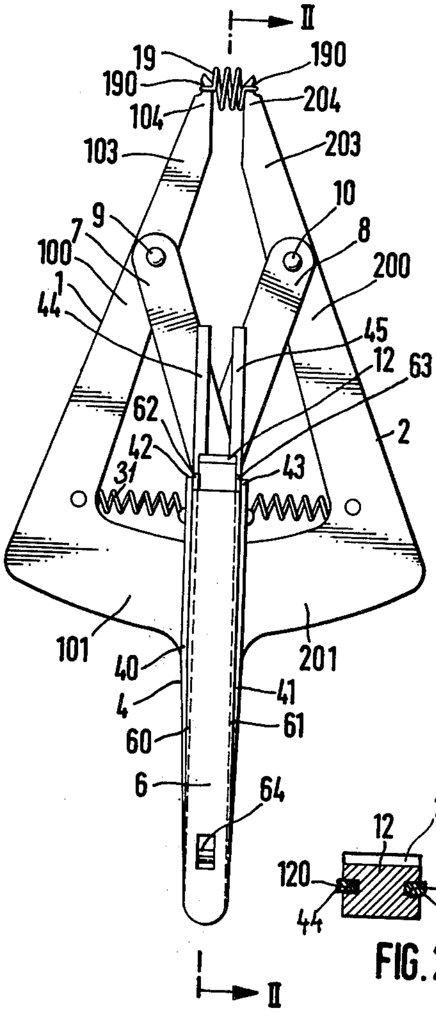
FIG. 2
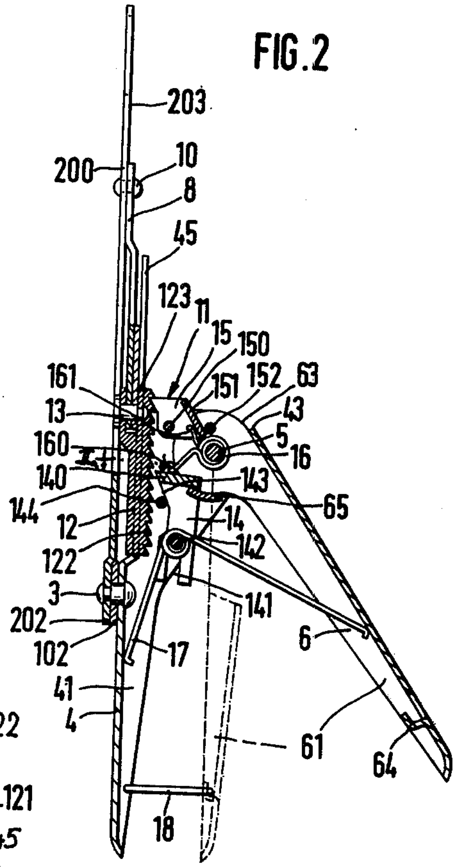
FIG. 2a

FIG.5
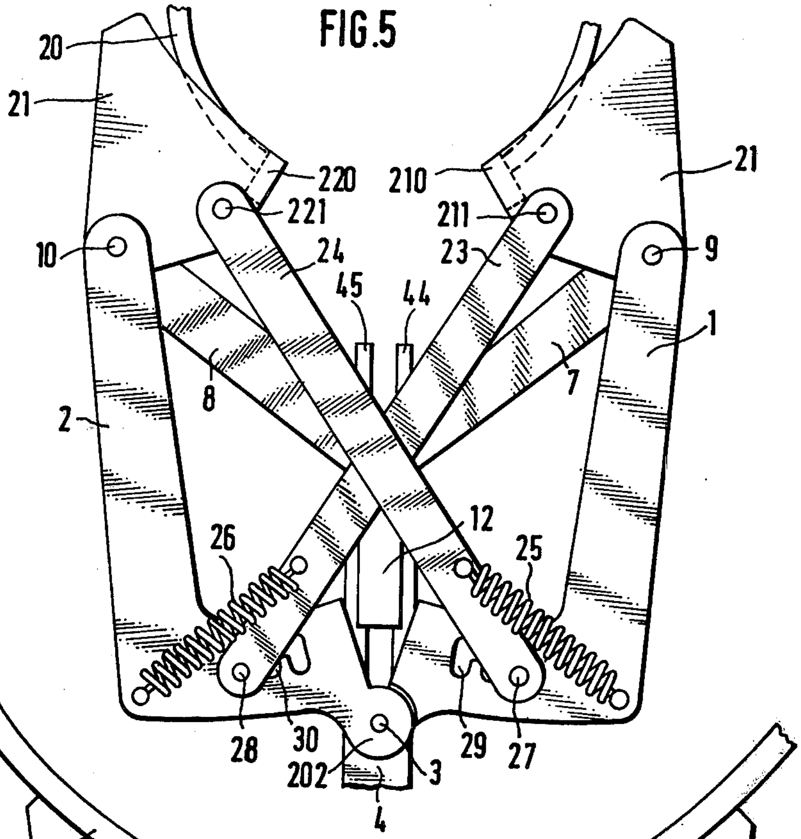
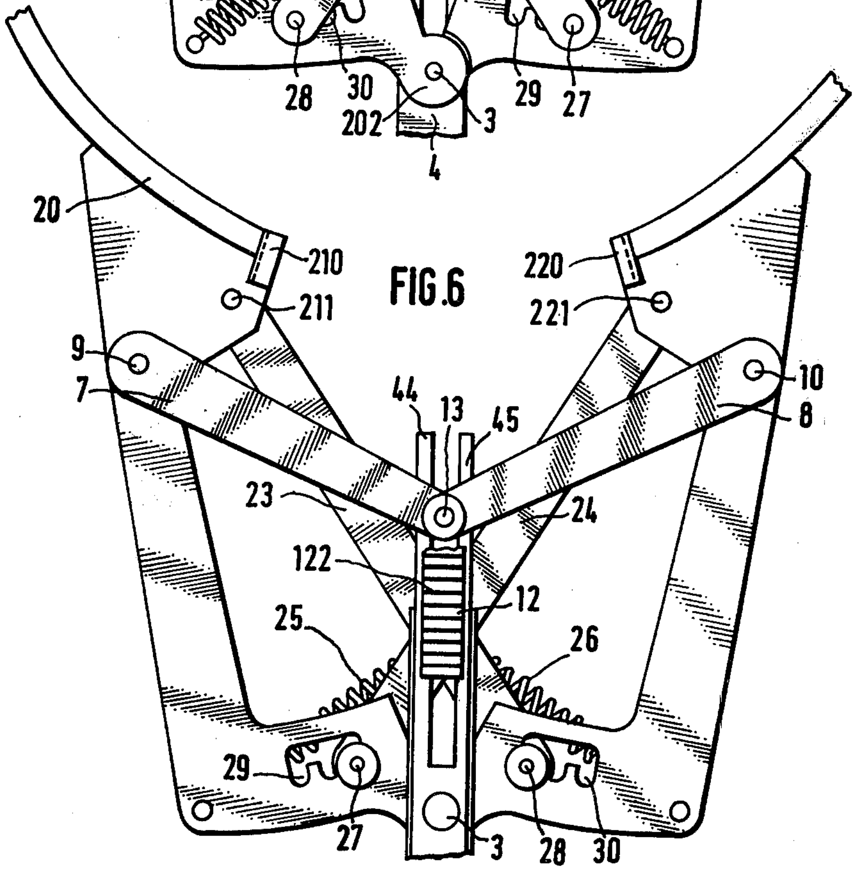
FIG.6

EXPANDER DEVICE

BACKGROUND OF THE INVENTION

The present invention relates to an expander device, particularly for use in expanding springs, piston rings, circlips and similar objects.

There are already known various devices of the type here under consideration which, generally speaking, are used for either expanding or compressing springs, piston rings, circlips or similar objects prior to the mounting of such objects at the locations of intended use, or prior to removal of such objects from such locations. In one of such devices, which is intended for use in spreading apart the ends of a split piston ring, the structural elements which constitute the device include a pair of levers and a pair of jaws, the latter being provided with abutment portions which contact and engage the ends of the respective piston ring, the jaws being connected to the levers by means of a pair of connecting links. In this conventional device, each of the levers forms a parallelogram linkage with the associated connecting links and with the associated jaw. A spindle is provided which has threads of opposite pitches and a pair of nuts is provided each of which is pivotally mounted on one of the levers and threadingly engages the respective threaded portion of the spindle. This device is disadvantageous in that the user of such a device needs both hands for operating such a device.

Another expander device also known to the prior art is similar to the previously described device in that it also includes a pair of levers, a pair of jaws, and a pair of connecting links. However, in this device the levers are pivotally connected at different points to a connecting element and are in positive engagement with one another. This device includes a pair of pressing arms which have front ends and are pivoted at such front ends to the levers, such arms acting upon the jaws so as to spread the same apart. While it is true that in this embodiment the user of the device can spread the jaws apart by using only one hand, such operation requires a rather substantial amount of force. It will be appreciated that such a force will have to be maintained for an extended period of time while the piston ring is either removed from its position on the piston, on the one hand, or located on the piston in its proper position, on the other hand. A disadvantage which is encountered in both of these embodiments is that such devices are so constructed as to be able to cooperate with rings of particular dimensions, and cannot be modified without complete reconstruction for use with rings of different dimensions.

SUMMARY OF THE INVENTION

Accordingly, it is a general object of the present invention to avoid the disadvantages of the prior art.

More particularly, it is an object of the present invention to provide an expander device which is simple in construction and reliable in operation.

It is a further object of the present invention to provide an expander device for use in expanding springs, piston rings, circlips and similar objects which can be operated by the user of such device by using only one hand.

It is a concomitant object of the present invention to provide an expander device which can be used for expanding springs, piston rings and similar objects of different dimensions.

Still another object of the present invention is to provide an expander device in which the amount of force required for operating the same is significantly reduced compared to prior-art devices.

Yet another object of the present invention is to provide an expander device in which the jaws can be arrested in a plurality of spread-apart positions.

In pursuance of these objects and others which will become apparent hereafter, one feature of the present invention resides, in an expander device, particularly for expanding springs, piston rings, circlips and similar objects, in a combination which comprises a support member; an actuating member mounted on the support member for pivoting about an axis; a pair of expanding jaws mounted on the support member, at least one of the jaws being pivotable relative to the support member, the expanding jaws having respective free end portions adapted to engage an object to be expanded; and transmission means interposed between the actuating member and at least the one jaw and being operative for pivoting the latter relative to the support member and away from the other jaw in response to pivoting of the actuating member, to thereby expand the object.

In a currently preferred embodiment of the present invention, both jaws are pivoted on the support member, and the transmission means interposed between the actuating member and both jaws so that the latter are simultaneously moved apart in response to actuation of the actuating member. The actuating member and the support member each has a handgrip portion so that the device can be operated by the user in such a manner that the two handgrip portions are grasped only in one hand.

The transmission means includes a ratchet mechanism, and a pair of connecting links which extend between the ratchet mechanism and the respective jaws and are pivoted thereto. Because of the construction of the transmission means as a ratchet mechanism, the jaws can be arrested in any position relative to one another, and particularly in a plurality of spread-apart positions. The forces which are exerted by the expanded spring or piston ring on the jaws in their spread-apart positions are not transmitted to the actuating member except to the extent that they have to be overcome when operating the actuating member, such forces being rather counteracted by the ratchet mechanism and transmitted thereby to the support member. According to the present invention, the ratchet mechanism, together with the construction of the actuating member as a lever, result in a considerable transmission ratio between the movement of the hand which actuates the handgrip portion of the actuating member, on the one hand, and the displacement of the jaws away from one another, on the other hand. This, in turn, results in a considerable reduction of the force which has to be applied to the handgrip portion of the actuating member relative to the forces which are exerted by the jaws on the object to be expanded. The presence of the transmission ratio permits easy and accurate expanding of the springs or piston rings without running the risk that the spring will be overtensioned or overexpanded, or that the piston ring will break.

In a currently preferred embodiment of the present invention, the pivot axes of the jaws, on the one hand, and of the actuating member, on the other hand, are normal to one another. The pivot of the actuating member is supported in portions of lateral walls of the support member. The actuating member may also have lateral walls which are received between the lateral walls of the support member and are mounted on the pivot for the actuating member.

The ratchet mechanism is of a particularly simple construction when it includes, as proposed by the present invention, a rack which is provided with a plurality of detent teeth and which is mounted on the support member for translation longitudinally of itself. In this event, two pawls may be provided which are in operative connection with the actuating member and which are adapted to engage the detent teeth of the rack, one of the pawls engaging the detent teeth for displacing the rack longitudinally thereof in a predetermined direction, and the other pawl arresting the rack against movement in the opposite direction.

When the actuating member is operated, that is, pivoted about its pivot, the transporting pawl moves the rack by a distance corresponding to the spacing of one or two teeth, and then the arresting pawl arrests the rack in such a displaced position. Thus, no matter for how long the expanded object is to be held in its expanded position, and no matter how the object is to be manipulated in order to have it properly located at the place of its intended use, the possibility that the hand of the user will become tired before properly setting the object is eliminated. When the expanded object is to assume its natural state given by its springiness, either upon mounting the object at its proper location or upon dismounting such object, a simple actuation of the arresting pawl in the sense of disengagement from the detent teeth will result in movement of the rack in the opposite direction and thus in movement of the jaws toward one another. This can be achieved, in the device according to the present invention, by simply operating the actuating lever in a direction opposite to its normal operation.

The rack is mounted on the front portion of the support member for movement in the frontward direction and opposite thereto upon release of the arresting pawl. Advantageously, the rack is mounted on a guide track which includes a pair of guide strips which extend parallel to one another and with spacing from each other. A pivot is mounted on the front portion of the rack which connects the connecting links to the rack for pivoting relative thereto.

The transporting pawl is mounted on a pivot for pivoting and shifting relative thereto, being provided with an elongated slot in which the pivot is received. The transporting pawl further includes a cam surface which is in contact with a cam portion of the support member, being urged toward such contact by a spring. A projection is formed on the actuating member which displaces the transporting pawl when the actuating member is actuated.

The arresting pawl is mounted on a pivot which extends between the lateral walls of the support member, and is acted upon by a spring which urges the arresting pawl toward engagement with the detent teeth of the rack. The arresting pawl has a cam surface, and the actuating member has a projecting portion which cooperates with the cam surface. When the actuating member is in the rest position thereof, the projecting portion of the actuating member abuts against the cam surface of the arresting pawl, and further movement of the actuating member away from the support member results in displacement of the arresting pawl from between the detent teeth of the rack so that the rack is released for movement in the rearward direction of the support member.

Both the transporting pawl and the arresting pawl are acted upon by ends of a single helical spring which is mounted on the pivot of the actuating member. An arresting arrangement may be provided on both the support member and the actuating member, such arresting arrangement arresting the actuating member in a predetermined position relative to the support member, particularly in the lowermost position thereof.

When the device of the present invention is to be used for expanding or tensioning springs, then the respective connecting links are pivotally connected to the respective jaws, the jaws having integral end portions which are formed with depressions in which the spaced ends of the respective spring are received. On the other hand, when the device of the present invention is to be used for spreading apart split piston rings or similar objects, then the respective jaws may have lever elements and jaw elements which are connected to one another by a pivot, the respective connecting link being also pivoted on such pivot, and a pair of additional connecting links may be provided which extend between and connect a respective jaw element mounted on one of the lever elements, to the other lever element. A pair of springs may also be provided which respectively act on the additional connecting links and on the respective associated lever elements.

In order to be able to handle piston rings of different diameters, the ends of the additional connecting links which cooperate with the lever elements may be connected to the latter by means of a pin which is accommodated in an elongated slot of the lever element for displacement longitudinally of such slot between a plurality of positions, and an arresting arrangement may be provided which arrests the pin and thus the additional connecting link in a predetermined position relative to the elongated slot. Preferably, the elongated slot has a plurality of enlarged portions, and the pin is received in a selected one of the enlarged portions. As a result of this arrangement, the jaw elements conduct movements away from one another along circular paths, the radii of such circular paths being selected by properly positioning the pins in the elongated slots, and also corresponding to the movement of the end portions of the piston rings as they are spread apart by the expander device of the present invention. The jaw elements have abutment portions which engage the ends of the piston ring.

It will be appreciated that while the present invention has been discussed in connection with expanding springs or piston rings, a slight modification of the device will suffice to convert it for use in compressing springs or piston rings. Basically, such modification would involve only a rearrangement of the rack and the associated arresting and transporting pawls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a top plan view of the device of the present invention for use in expanding springs;

FIG. 2 is a cross-sectional view taken on line II—II of FIG. 1;

FIG. 2*a* is a partial cross-sectional view taken on line II*a*—II*a* of FIG. 1;

FIG. 5 is a bottom plan view of the device of FIG. 3 as used in spreading a piston ring of a relatively small diameter; and FIG. 6 is a top plan view of the embodiment of FIG. 3 as used in spreading a relatively large piston ring.

DETAILED DISCUSSION OF THE PREFERRED EMBODIMENTS

Figure 3:
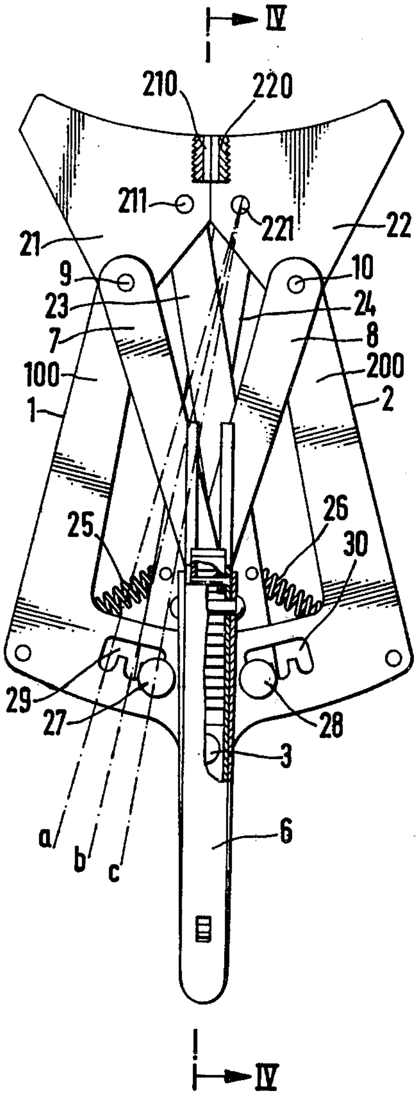
FIG. 3 is a top plan view of a different embodiment of the present invention for use in spreading split piston rings.

Referring now to the drawings, and first to FIGS. 1 and 2 thereof, it may be seen that the expander device of the present invention includes a jaw 1 and another jaw 2 which are of angular configurations. The jaw 1 has a lever portion 100, an angular portion 101, a pivoted end portion 102, a projecting portion 103 and a free end portion 104.

Similarly, the jaw 2 has a lever portion 200, an angular portion 201, a pivoted end portion 202, a projecting portion 203 and a free end portion 204. The free end portions 104 and 204 of the jaws 1 and 2 can be inserted into openings 190 of a spring 19 so that the spring 19 can be expanded by the jaws 1 and 2 in a manner which will be explained later.

Referring now more particularly to FIG. 2, it may be seen therein that the end portions 102 and 202 of the jaws 1 and 2 are mounted on a pivot 3 which, in turn, is supported in a support member 4. The support member has lateral portions 40 and 41 which include support portions 42 and 43 in the front region of the support member 4 when considered in direction toward the free end portions 104 and 204 of the jaws 1 and 2. A pivot 5 is supported in the support portions 42 and 43. The support member 4 includes a guide track which encompasses two guide strips 44 and 45 which extend parallel to one another and with spacing from each other along the axis of symmetry of the support member 4.

An actuating member 6 is supported on the pivot 5 for pivoting about the same. The actuating member 6 includes lateral wall portions 60 and 61 which include support portions 62 and 63 in the front regions thereof. The support portions 62 and 63 of the lateral wall portions 60 and 61 are mounted on the pivot 5. The spacing of the support portions 62 and 63 from one another is smaller than the spacing of the support portions 42 and 43 from one another so that the support portions 62 and 63 are received between the support portions 42 and 43 of the support member 4. The rear end of the actuating member 6 is formed with a hook-shaped projection 64, and an arresting bracket 18 is mounted at the rear end of the support member 4. As illustrated in phantom lines in FIG. 2, the arresting bracket 18 is capable of engaging the hook-shaped projection 64 to thereby arrest the actuating member 6 relative to the support member 4, preferably in the position in which the actuating member 6 is in its closest position relative to the support member 4.

As can be particularly ascertained from FIG. 2, the expander device of the present invention includes a ratchet mechanism 11 which includes a rack 12 that is shown in particular detail in FIG. 2*a*. The rack 12 is formed with recesses 120 and 121 in which the guide strips 44 and 45 of the support member 4 are received so that the rack 12 is mounted for sliding longitudinally of the guide strips 44 and 45. The side of the rack 12 which faces away from the support member 4 is provided with a plurality of detent teeth 122 which act as transport teeth and simultaneously also as arresting teeth as will be explained later.

The front end of the rack 12 is bifurcated, thus forming a depression 123, and end portions of connecting links 7 and 8 are received in the depression 123. A pivot 13 extends across the depression 123 and pivotally connects the connecting links 7 and 8 with the rack 12. Pivots 9 and 10, such as rivets, connect the other end portions of the connecting links 7 and 8 with their associated jaws 1 and 2, respectively. A non-illustrated conventional washer may be interposed between the respective connecting links 7 and 8 and the jaws 1 and 2.

As also seen particularly in FIG. 2, a transporting pawl 14 and an arresting pawl 15 cooperate with the rack 12 and particularly with the detent teeth 122 thereof. The actuating member 6 is so constructed as to actuate both the transporting pawl 14 and the arresting pawl 15 so as to operate the ratchet mechanism.

The transporting pawl 14 includes a transporting projection 140, and is formed with a guide slot 141. A pin 142 is mounted on the lateral portions 40 and 41 of the support member 4 and extends between the portions 40 and 41. The transporting pawl 14 is mounted on the pin 142 for pivoting and shifting movement relative thereto, in that the pin 142 is received in the slot 141 of the transporting pawl 14. The transporting pawl 14 further has a cam surface 143, and a cam portion 144 extends between the lateral portions 40 and 41 of the support member 4, the cam surface 143 cooperating with the cam portion 144. As seen in FIG. 2, a spring 160 acts on the transporting pawl 14 and urges the same toward contact of the cam surface 143 with the cam portion 144.

The arresting pawl 15 is mounted on a pivot 150 for pivoting about the same, the pivot 150 being mounted in the support portions 42 and 43 of the lateral portions 40 and 41 of the support member 4. A spring 161 acts on the arresting pawl 15, and the latter has a cam surface 151 with which a projecting portion 152 of the actuating member 6 can cooperate.

It will appear from the perusal of FIG. 2 that the springs 160 and 161 are constituted by end portions of a helical spring 16 which is mounted on the pivot 5 for the pivoting connection of the actuating member 6 to the support member 4.

The actuating member 6 further includes a projection 65 which cooperates with the transporting pawl 14 to urge the same against the force exerted upon the same by the spring 160 when the actuating member 6 is operated. A further spring 17 is mounted on the pin 142 for the transporting pawl 14, the spring 17 also being of a helical configuration and having end portions which act on the actuating member 6 and brace against the support member 4. When the actuating member 6 is displaced toward the support member 4, the projection 65 displaces the transporting pawl 14 contrary to the action of the spring 160, partially in the forward direction of the support member 4. During such displacement, the cam surface 143 of the transporting pawl 14 cooperates with the cam portion 144 in such a manner that the transport projection 140 of the transporting pawl 14 is guided into a groove between any two of the detent teeth 122. When the actuating member 6 is now displaced further, the rack 12 is displaced longitudinally of the guide strips 44 and 45 in the forward direction of the support member 4 by a distance corresponding to the spacing between one or two of the detent teeth 122 of the rack 12. Simultaneously therewith, the force of the spring 161 is overcome and the arresting pawl 15 thus permits the rack 12 to pass by. On the other hand, the arresting pawl 15 arrests the rack 12 against movement in the opposite, that is rearward, direction under the influence which the spring 19 to be expanded exerts on the jaws 1 and 2, when the force acting on the actuating member 6 is discontinued. The movement of the rack 12 is transmitted to the connecting links 7 and 8 so that the latter displace the jaws 1 and 2 away from one another. The spring 19 can be expanded or tensioned to the requisite extent by operating the actuating lever 6 several times, while the arresting pawl 15 prevents return movement of the rack 12 intermediate the consecutive operations of the actuating member 6. As a result of this intermediate arresting of the rack 12, the user of the device needs only use a small amount of force and for shorter periods of time for operating the actuating member 6 and thus for spreading the jaws 1 and 2 apart, when compared to the prior art constructions.

When it is desired to return the rack 12 to its original position, the actuating member 6 is displaced away from the support member 4 beyond its normal rest position so that the projection 152 presses against the cam surface 151 of the arresting pawl 15, so that the force of the spring 161 is overcome and the arresting pawl 15 is removed from between the detent teeth 122 of the rack 12. In order to enhance the return movement of the rack 12, a spring 31 may be provided which connects the jaws 1 and 2 with one another, such spring being a tension spring which urges the jaws 1 and 2 toward one another. However, such a spring may be omitted, the only detriment being that the return of the rack 12 is not achieved automatically but must be attended to manually, unless a spring 19 extends between the free end portions 104 and 204 at this time.

As seen in FIGS. 1 and 2, the support member 4 and the actuating member 6 both have handgrip portions which are so configurated as to fit into the hand of the user of the device. These handgrip portions are spaced from the free ends 104 and 204 of the jaws 1 and 2, that is, they are located at the rear portion of the device.

Figure 4:
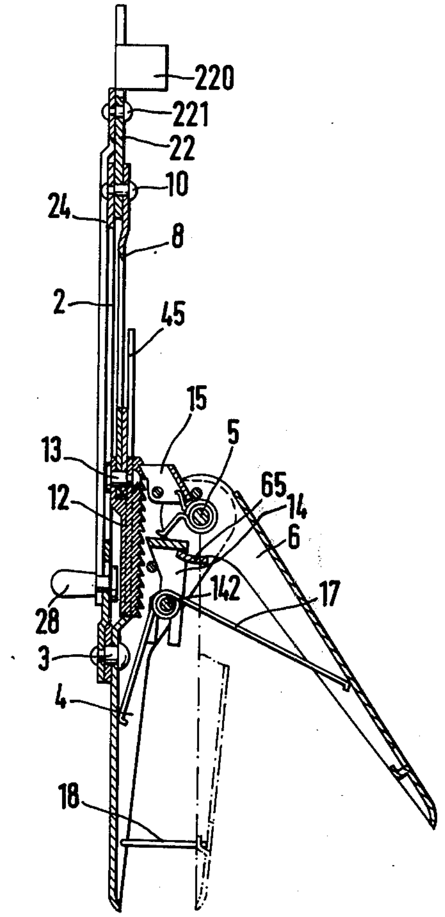
FIG. 4 is a cross-sectional view taken on line IV—IV of FIG. 3.

FIGS. 3 and 4 illustrate a modified embodiment of the device of the present invention which is to be used for spreading apart or expanding piston rings and similar objects. This modified embodiment is in many respects similar to that discussed in connection with FIGS. 1 and 2, so that the same reference numerals have been used to designate similar parts.

In order to be able to spread the end portions of split piston rings apart, the jaws 1 and 2 include jaw elements 21 and 22 which are mounted at the ends of the lever portions 100 and 200 of the jaws 1 and 2. Pivots 9 and 10, such as rivets, connect the jaw elements 21 and 22 to the lever portions 100 and 200 of the jaws 1 and 2. The jaw elements 21 and 22 have abutment portions 210 and 220 which extend out of the general planes of the jaw elements 21 and 22 and which abut, as illustrated in FIGS. 5 and 6, against the end portions of the piston ring 20. A pair of additional links 23 and 24 is provided which are connected to the respective jaw elements 21 and 22 by means of pivots 211 and 221, the additional connecting links 23 and 24 being connected to the jaws 1 and 2, springs 25 and 26 extending between the additional connecting links 23 and 24 and the associated jaws 1 and 2. The end portions of the additional connecting links 24 and 25 which are spaced from the pivots 9 and 10 carry pins 27 and 28 which are received in elongated slots 29 and 30 of the jaws 1 and 2. The slots 29 and 30 have enlarged portions, and the pins 27 and 28 can be received in any of such enlarged portions. Thus, the additional connecting links 23 and 24 may assume a plurality of positions which are indicated in FIG. 3 by the lines a, b and c. The additional connecting links 23 and 24 assure that the abutment projections 210 and 220 always engage the end portions of the piston ring substantially parallel thereto during spreading of the piston ring.

FIG. 5 illustrates the spread-apart position of the device of FIG. 3 in a bottom plan view. The pins 27 and 28 are located in those enlarged portions of the slots 29 and 30 which are indicated in FIG. 3 with the reference character a. It may be seen in FIG. 5 that the abutment projections 210 and 220 are parallel to the ends of a relatively small piston ring 20.

On the other hand, as indicated in FIG. 6, the device of FIG. 3 can be used also for spreading relatively large piston rings 20. In this case, the pins 27 and 28 are received in those enlarged portions of the slots 29 and 30 which are indicated in FIG. 3 with the reference character c.

It will be appreciated that the device of the present invention can be easily modified for use in compressing springs or cylinder rings or circlips and similar objects by simply rearranging the rack 12 and the cooperating transporting pawl 14 and the arresting pawl 15, such a modification being also contemplated by the present invention.

It will be understood that each of the elements described above, or two or more together, may also find a useful application in other types of constructions differing from the types described above.

While the invention has been illustrated and described as embodied in an expander device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device of the character described, particularly for stressing springs, piston rings, circlips and similar objects, comprising a support member; an actuating member mounted on said support member for pivoting about an axis; a pair of jaws mounted on said support member, at least one of said jaws being pivotable relative to said support member, said jaws having respective free end portions adapted to engage an object to be stressed; and transmission means interposed between said actuating member and at least said one jaw and being operative for pivoting the latter relative to said support member and the other jaw in response to pivoting of said actuating member so as to apply stressing forces to the object, including a ratchet mechanism actuated by said actuating member, and at least one connecting link extending between and pivoted to said ratchet mechanism and said one jaw, said ratchet mechanism including a rack having a plurality of detent teeth, means for mounting said rack on said support member for translatory displacement longitudinally thereof, and a pawl connected to said actuating member for movement therewith into and out of engagement with said detent teeth to thereby displace said rack in a predetermined direction.

2. A device as defined in claim 1, wherein said support member and said actuating member are each formed with a handgrip portion.

3. A device as defined in claim 1, wherein said other jaw is also pivoted on said support member; and wherein said transmission means simultaneously pivots said jaws away from one another.

4. A device as defined in claim 3, wherein said transmission means further includes an additional connecting link pivoted to and extending between said ratchet mechanism and said other jaw.

5. A device as defined in claim 4, and further comprising a pivot which connects the respective connecting link to the associated jaw.

6. A device as defined in claim 1, wherein said ratchet mechanism further includes an arresting pawl, and means for urging said arresting pawl toward engagement with said detent teeth to thereby arrest said rack against movement opposite to said predetermined direction.

7. A device as defined in claim 6, and further including means for disengaging said arresting pawl from said detent teeth against the action of said urging means to thereby release said rack for movement opposite to said predetermined direction.

8. A device as defined in claim 1, wherein said mounting means includes a guide track mounted at an end of said support member which is close to said free end portions of said jaws.

9. A device as defined in claim 8, wherein said guide track includes a pair of parallel and spaced guide strips.

10. A device as defined in claim 8, wherein said support member has an axis of symmetry and an axially spaced front end section close to, and a rear end section remote from, said free end portions of said jaws; and wherein said guide track extends parallel to said axis of symmetry at said front end section.

11. A device as defined in claim 10, wherein said rack has a front end portion; and wherein said transmission means further includes a pivot which connects said connecting links with said front end portion of said rack.

12. A device as defined in claim 11, wherein said front end portion is bifurcated and defines a depression; and wherein said connecting links are partly received in said depression and said pivot extends across the same.

13. A device as defined in claim 1, wherein said pawl is mounted on said support member for pivoting and sliding relative thereto and has a cam surface; and further including a cam portion stationarily mounted on said support member at said cam surface, and means for urging said pawl against said cam portion.

14. A device as defined in claim 13, wherein said support member has lateral walls which bound a recess; and wherein said rack and said cam portion are situated within said recess.

15. A device as defined in claim 1, wherein said actuating member has a portion which engages said pawl to thereby entrain and move the latter.

16. A device as defined in claim 7, and further comprising a pivot mounting said arresting pawl on said support member; and wherein said urging means includes a spring.

17. A device as defined in claim 16, wherein said arresting pawl has an abutment portion; and wherein said disengaging means includes a projection on said actuating member which is adapted to engage said abutment portion and displace the same so that said arresting pawl disengages from said detent teeth.

18. A device as defined in claim 16, wherein said urging means includes a helical spring mounted on said pivot and having two ends one of which abuts against said pawl and the other against said arresting pawl.

19. A device as defined in claim 13, and further including a pivot on said support member, said pawl having an elongated slot and being so mounted on said pivot that the latter is received in said slot, and further including a helical spring mounted on said pivot and having end portions which abut against said support member and said actuating member, respectively and thus urge the latter away from the former.

20. A device as defined in claim 4, wherein each of said jaws includes a lever element pivoted on said support member, a separate jaw element, and a pivot connecting said jaw element with said lever element; wherein the respective connecting link is connected to said pivot; and further comprising a pair of additional connecting links each of which respectively extends between and is pivotably connected to the respective jaw element and the other lever element on which the other jaw element is pivoted.

21. A device as defined in claim 20, wherein each respective lever element is formed with an elongated slot; and further comprising a pivot which is mounted on the respective additional connecting link and received in the elongated slot of the associated lever element for displacement longitudinally of said slot between a plurality of positions.

22. A device as defined in claim 21, and further comprising means for arresting said pivot in a selected one of said positions.

23. A device as defined in claim 22, wherein said arresting means includes enlarged portions of said slot; and means for urging said pivot into a selected one of said enlarged portions.

24. A device as defined in claim 23, wherein said urging means includes a spring which extends between and is connected to the respective additional connecting link and the associated other lever element.

25. A device as defined in claim 1, wherein said free end portions of said jaws are formed with recesses adapted to receive end portions of a spring.

26. A device as defined in claim 1, wherein said free end portions of said jaws are formed with abutment portions adapted to engage end portions of split piston rings.

27. An expander device, comprising a support member; an actuating member mounted on said support member for pivoting in a first plane about a first axis; a pair of jaws mounted on said support member, at least one of said jaws being pivotable relative to said support member in a second plane which is normal to said first plane and about a second axis which is normal to said first axis, said jaws having respective free end portions adapted to engage an object to be stressed; transmission means interposed between said actuating member and at least said one jaw and being operative for pivoting the latter relative to said support member and to a position relative to the other jaw in response to pivoting of said actuating member; and means for arresting said one jaw at a plurality of predetermined positions relative to the other jaw but independently of the position of said actuating member, whereby a selected degree of expansion particularly adapted to the object is maintained dispensing with the need for a continuing application of force on said actuating member, said arresting means including a rack slidably mounted on said support member and having a plurality of teeth, and a pawl also mounted on said support member pivotably in a plane which is normal to said second plane in which said one jaw is pivotable and about a further axis which is normal to said second axis about which said one jaw is pivotable, said pawl being actuated by said actuating member and engageable with said detent teeth of said rack so as to maintain said one jaw in a selected position relative to said other jaw.

28. A device as defined in claim 27, wherein said support member has lateral walls parallel to said first plane; and further including a pivot for said actuating member which is mounted in said lateral walls and extends normal to said first plane.

29. A device as defined in claim 28 wherein said actuating member has lateral wall portions; and wherein said lateral wall portions are mounted on said pivot and received between said lateral walls of said support member.

30. A device as defined in claim 27, said transmission means comprising means for pivoting said one jaw in one direction in response to pivoting of said actuating member so as to apply a stressing force to the object, and means for releasing said actuating member from said one jaw for independent pivoting in the opposite direction.

31. a device as defined in claim 27, said pawl being operative for arresting backward motion of said rack on said support member while permitting only forward motion of the rack.

32. A device as defined in claim 31, said rack having more than a dozen of the teeth arranged in a row substantially parallel to said support member.

33. A device as defined in claim 31, wherein said actuating member causes said rack to move forwardly on said support member when said actuating member is depressed towards said support member; and further comprising means connected to said actuating member for detaining forward movement of the rack beyond a distance corresponding to the approximate spacing of two teeth of said rack per each depression of said actuating member towards said support member.

34. A device as defined in claim 27, said support member including an elongated base and at least one sidewall extending upwardly from a longitudinally extending side of the base; a first pivot supported above the base of said support member by said one sidewall and mounting said actuating member for pivoting about said first axis in said first plane means for mounting said jaws on said support member, including one second pivot connected to the base of said support member and mounting said one jaw on said support member for pivoting said one jaw about said second axis and in said second plane substantially normal to said first plane, said second pivot longitudinally extending in a direction substantially normal to the longitudinal extent of said first pivot, whereby a force required for operating said actuating member is significantly reduced due to the relative orientations of said first and second pivots.

35. A device as defined in claim 34, said second pivot mounting both of said jaws.

* * * * *